(12) United States Patent
Plomb et al.

(10) Patent No.: US 9,422,163 B2
(45) Date of Patent: Aug. 23, 2016

(54) METHOD OF PRODUCTION OF GRAPHITE OXIDE AND USES THEREOF

(71) Applicant: Belenos Clean Power Holding AG, Bienne (CH)

(72) Inventors: Benoit Plomb, Fontanezier (CH); Jérémie Geinoz, Genève (CH); Roger Marti, St. Ursen (CH); Ennio Vanoli, Corminboeuf (CH); Jean-Pascal Bourgeois, Fribourg (CH)

(73) Assignee: Belenos Clean Power Holding AG, Bienne (CH)

( * ) Notice: Subject to any disclaimer, the term of this patent is extended or adjusted under 35 U.S.C. 154(b) by 0 days.

(21) Appl. No.: 14/612,380

(22) Filed: Feb. 3, 2015

(65) Prior Publication Data
US 2015/0218002 A1 Aug. 6, 2015

(30) Foreign Application Priority Data

Feb. 5, 2014 (EP) .................................... 14153998

(51) Int. Cl.
*C01B 31/04* (2006.01)

(52) U.S. Cl.
CPC ......... *C01B 31/043* (2013.01); *C01B 31/0476* (2013.01); *Y10T 428/2982* (2015.01)

(58) Field of Classification Search
CPC ............ C01B 31/043; C01B 31/0476; Y10T 428/2982
USPC ....................................................... 423/448
See application file for complete search history.

(56) References Cited

U.S. PATENT DOCUMENTS

| 4,091,083 | A | | 5/1978 | Hirschvogel et al. |
| 4,094,951 | A | * | 6/1978 | Ishikawa ............. C01B 31/0423 264/120 |
| 2007/0092432 | A1 | * | 4/2007 | Prud'Homme ....... C01B 31/043 423/448 |
| 2011/0014111 | A1 | * | 1/2011 | Leugers ................. B82Y 30/00 423/415.1 |
| 2011/0274610 | A1 | * | 11/2011 | Paquette ............... C01B 31/043 423/415.1 |
| 2011/0280787 | A1 | * | 11/2011 | Chen ................... C01B 31/0423 423/415.1 |
| 2012/0277360 | A1 | * | 11/2012 | Scheffer ............... C09D 177/00 524/237 |

FOREIGN PATENT DOCUMENTS

EP 2 445 049 A1 4/2012

OTHER PUBLICATIONS

"Particle Size Conversion Table," accessed online at http://www.sigmaaldrich.com/chemistry/stockroom-reagents/learning-center/technical-library/particle-size-conversion.html on Jan. 9, 2016.*
Park et al., Hydrazine-reduction of graphite- and graphene oxide, 2011, Carbon, 49, 3019-3023.
Schafhaeutl, On the combinations of carbon with silicon and iron, and other metals, forming the different species of cast iron, steel, and malleable, 1840, The London and Edinburgh Philosophical Magazine, 16(104):570-590.

(Continued)

*Primary Examiner* — Daniel C McCracken
(74) *Attorney, Agent, or Firm* — Oblon, McClelland, Maier & Neustadt, L.L.P.

(57) ABSTRACT

The present invention is related to a new scalable method of forming graphite oxide (only one or few layers of carbon atoms) of high purity (notably without metallic residues) and high oxidation degree from graphite flakes in a cost-effective and reduced environmental impact.

18 Claims, 1 Drawing Sheet

(56) References Cited

OTHER PUBLICATIONS

Zhu et al., Graphene and Graphene Oxide: Synthesis, Properties, and Applications 2010, Advanced Material, 22, 3906-3924.
Kaspar et al., 2010, Graphen-abgeleitete Materialien, DISS. ETH Nr. 18931., p. 50-51, 1-157.
Hofmann et al., 1939,Ber. Deut. Chem. Gesell. B, 72B: p. 754-771.
Boehm et al., Uber den Bildungsmechanismus des Graphitoxids, 1967, Anorg. Allg. Chemie, 353, 236-242.
Staudenmaier, 1898, Berichte der Deutschen Chemischen Gesellschaft, 31, 1481-1487.
Hummers and Offeman, Preparation of Graphitic Oxide, Mar. 20, 1958, Am. Chem. Soc., 80(6):1339.
Ye et al., "Fast and Facile Preparation of Graphene Oxide and Reduced Graphene Oxide Nanoplatelets," Chem. Mater. 2009, 21, 3514-3520.
Dresselhaus et al. Intercalation compounds of graphite, 2002, Advances in physics, 51:1, 1-186.
Chung, 2002, Review Graphite, Composite Materials Research Laboratory, 37, 1475-1489.
Bayat et al., Oil Sorption by Synthesized Exfoliated Graphite (EG) 2008, Iranian Journal of Chemical Engineering vol. 5, No. 1.
Pei et al., The reduction of graphene oxide, 2012, Carbon, 50, 3210-3228.
Search report issued in corresponding European application 14153998.1 completed Jun. 14, 2014.
Leopold Gmelin: "Gmelins Handbuch der Anorganischen Chemie—Kohlenstoffl" In: "Gmelins Handbuch der Anorganischen Chemie 8. Auflage, Teil B, Lieferung 3", Jan. 1, 1968, Weinheim/ Bergstr. Verlag Chemie, Weinheim, XP055121849, pp. 824-847.
H P Boehm et al: ~Uber den Bildungsmechanismus des Graphitoxids, Zeitschrift fur anorganische und allgemeine Chemie. vol. 353, Jan. 1, 1967, pp. 236-242, XP055121167. 001: 10.1002/ zaac.19673530503 Retrieved from the Internet: URL:http:// onlinelibrary.wiley.com/store/10.1002/zaac.19673530503/asset/ 19673530503ftp.pdf?v=1&t=hvxykuoa &s=21692a4a19594ceb3d374b04444ecd85760977d2 [retrieved on Jun. 2, 2014].
Daniel R. Dreyer et al: The chemistry of graphene oxide, Chemical Society Reviews, vol. 39, No. 1, Jan. 1, 2010, p. 228, XP55052571, ISSN: 0306-0012.
Park S et al: "Chemical methods for the production of graphenes",Nature. Nature Publishing Group. United Kingdom. vol. 4. No. 4, Apr. 1, 2009, pp. 217-224, XP002558423, ISSN: 0028- 0836, DOI: 10.1038/NNANO.2009.58 [retrieved on Mar. 29, 2009].
Alliata, Investigation of Nanoscale intercalation into graphite and carbon materials by in situ Scanning Probe Microscopy, Inauguraldissertation der philosophisch-naturwissenschaftlichen Fakultat der Universitat Bern, Jun. 28, 2010, 4-6, 9-10, 64-68.
Marcano et al., Improved Synthesis of Graphene Oxide, ACSNano 2010, 4, 4806-4814.

\* cited by examiner

METHOD OF PRODUCTION OF GRAPHITE OXIDE AND USES THEREOF

TECHNICAL FIELD

This application claims priority from European Patent Application No. 14153998.1 filed on May 2, 2014, the entire disclosure of which is hereby incorporated herein by reference.

The present invention relates to the field of production of graphite oxide, in particular high oxidation degree graphite oxide.

DESCRIPTION OF RELATED ART

Graphene is a 2-dimensional (monoplane) crystal of carbon that is stable under ambient temperature that forms graphite by piling. Therefore, graphene can be described as a one-atom thick layer of graphite. It is to be noted that in the literature, the frontiers between the terms graphite and graphene are not always clearly defined but it is generally accepted to speak of "graphite" when there is a 3D arrangement of graphene layers and of "graphene" in absence of 3D arrangement (Park et al., 2011, Carbon, 4 9, 3 0 1 9-3 0 2 3). Graphene has attracted great interest for its excellent mechanical, electrical, thermal and optical properties and has been used in numbers of fields including bioengineering, composite materials, energy technology and nanotechnology and it is considered as a key component for energy storage devices and the development of fast and efficient bioelectric sensory devices. It can be produced by different methods including micro-mechanical exfoliation of highly ordered pyrolytic graphite, epitaxial growth, chemical vapor deposition (CVD), and the reduction of graphene oxide (GO). The graphene quality obtained after reduction of GO is limited by the precursor quality (graphene oxide) and the efficiency of the reducing method.

Graphite oxide, first reported over 150 years ago (*Schafhaeutl,* 1840, Phil. Mag, 16(104):570-), has now been the subject of increased research interest due to its role as a precursor for mass production of graphene-based materials. Graphite oxide, formerly called graphitic oxide, is a compound of carbon, oxygen, and hydrogen in variable ratios, which has a similar layered structure to graphite but the plane of carbon atoms in graphite oxide is heavily decorated by oxygen-containing groups, which not only expand the interlayer distance but also make the atomic-thick layers hydrophilic and has the structure as described in Zhu et al., 2010, *Advanced Material*, 22, 3906-3924.

Graphite oxide itself is an insulator. As a result, these oxidized layers can be exfoliated in water under moderate ultrasonication, stirring, or a combination of the two to lead to graphene oxide (GO). Sonication of graphite oxide can be a very time-efficient way of exfoliating graphite oxide (almost to levels of full exfoliation) into GO, but it can also heavily damage the graphene oxide layer, reducing them in surface size from micrometers to nanometres, and also produces a wide variety of GO platelet sizes which may impact importantly on their properties. The physical properties of GO, such as the electrical properties, band gap energy, transparency, optical properties, and surface charge are influenced by the type and quantity of the functional groups on the graphene oxide sheets. Moreover, the size of the GO sheets that can be obtained after ultrasonication is affected by the degree of oxidation of the starting graphite oxide. In fact, it has been observed that high degrees of oxidation of the GO increase functional groups and defect sites which can lead to a breakdown of the GO sheets during the exfoliation process from graphite oxide.

Graphite oxide is obtained by treating graphite with strong oxidizers. The properties of graphite oxides vary considerably, depending on the degree of oxidation and synthesis method. The composition of a complete oxidized carbon is 60% mass of carbon, 39% mass of oxygen and 1% mass of Hydrogen. The carbon/oxygen atomic ratio (C/O) for graphite oxide is a parameter usually used to determine the oxidation degree of the graphite. There are different ways to calculate the carbon/oxygen atomic ratio (C/O) for graphite oxide (such as described in Kaspar et al., 2010, *Graphen-abgeleitete Materialien, DISS. ETH Nr.* 18931., p50-51, Hofmann et al., 1939,*Ber. Deut. Chem. Gesell. B,* 72B: p. 754-71). The C/O atomic ratio should always be considered together with results from composition analysis obtained from other methods, for example, such as X-ray diffraction or Attenuated Total Reflectance (ATR) Fourier-Transformed Infrared spectroscopy (FT-IR).

The common methods for producing graphite oxide are the following ones, in which the graphite is treated with the following mixtures:

Brodie (1859): sodium chlorate ($NaClO_3$) and fuming nitric acid ($HNO_3$) wherein the graphite (as a powder, ~6 μm) is first oxidized to a "graphite salt" (Boehm et al., 1967, *Anorg. Allg. Chemie,* 353, 236-242) as follows:

Then, the active oxidant chlorine dioxide ($ClO_2$) is formed by reaction $NaClO_3$ and $HNO_3$ as follows:

The "graphite salt" is then further oxidized by $ClO_2$ into graphite oxide as follows:

This description of the Brodie reaction shows clearly that the $ClO_2$ is essential in this oxidation reaction. But $ClO_2$ is also a very unstable and explosive compound.

Staudenmaier (Staudenmaier, 1898, *Berichte der Deutschen Chemischen Gesellschaft,* 31, 1481-1487) which is similar to the Brodie method, but the solvent is a 2:1 mixture of concentrated sulfuric and nitric acid (conc. $H_2SO_4$/conc. $HNO_3$) and $NaClO_3$ is replaced by potassium chlorate ($KClO_3$). This solvent mixture has the advantage of being less volatile than only fuming nitric acid. This method produces less gazeous $ClO_2$ but the method is considered as being not very efficient and only produce high C/O ratio (>5).

Hummers and Offeman (Hummers and Offeman, 1958, *Am. Chem. Soc.,* 80(6):1339): potassium permanganate ($KMnO_4$) is added to a water-free mixture of concentrated sulfuric acid (conc. $H_2SO_4$), sodium nitrate ($NaNO_3$) and graphite powder which forms highly reactive oxidant manganese heptoxide which reacts with graphite to produce graphite oxide. If no toxic or explosive gas is formed by this method, unfortunately, water insoluble compounds are formed and difficult to wash and the resulting final product is then difficult to purify.

Improved Hummer (Marcano et al., ACSNano 2010, 4, 4806-4814): $KMnO_4$ is added to a mixture of concentrated sulfuric acid (conc. $H_2SO_4$) and phosphoric acid ($H_3PO_4$) and graphite. This method also produces water insoluble compounds that are very difficult to remove from the resulting product.

Ye et al. (Ye et al., *Chem. Mater.* 2009, 21, 3514-3520): graphite is reacted with dibenzoylperoxide at 110° C. for 10 min. This method is not scalable due to the high reactivity of the peroxide.

The oxidations are usually performed on 10 g scale of graphite over several days (3 to 4 days) and are repeated 2-to 3-times and then an ultracentrifugation is needed to exfoliate the so obtained graphite oxide to obtain graphite oxide which is highly dispersible in water (>1 mg/l). The degree of oxidation (and therefore the color) of the graphite oxide vary much with the oxidation method used. However, none of the above methods offer a method of production of graphite oxide and therefore of GO suitable for an industrial scale-up due to the production of explosive chlorine dioxide by methods derived from Brodie reaction, poor oxidation degree resulting from methods derived from Staudenmaier method and the need of use of large amounts of water and handling (filtrations) of the end-product in the washing steps. Currently, GO is prepared mostly based on the method proposed by Hummers and Offeman but the end product is difficult to purify due to the presence of manganese residues. Therefore, the method of Hummers and Offeman is not adapted to the production of GO for applications in electronics where any metallic residue in the graphene would be problematic.

In view of the foregoing and of the increasing number of applications of graphene oxide itself (Zhu et al., 2010, *Advance Materials*, 22, 3906-3924) as well as of the usefulness of graphene oxide as a precursor of graphene, there is a need for the developments of new methods of production of graphene oxide which are scalable and cost-effective, while enabling the production of highly oxidized graphene oxide sheets and avoiding the generation of toxic by-products.

SUMMARY OF THE INVENTION

The present invention is directed towards the unexpected findings that the use of intercalated graphite flakes as starting material allows the obtaining of a rapid oxidation into graphite oxide with a high degree of oxidation, while allowing its easy and cost-effective isolation from other reaction products by simple filtration. In particular, the invention is further directed towards the unexpected findings that the use of sulfate intercalated graphite flakes, in particular large sulfate intercalated graphite flakes, as starting material for the oxidation allows the obtaining of a more rapid oxidation into graphite oxide with a high degree of oxidation, while allowing its easy and cost-effective isolation from other reaction products by simple filtration. Notably, the invention is related to new methods of production of highly water-dispersible graphite oxide with a high degree of oxidation. In particular, the graphite oxide obtained by the method according to the invention can be easily converted into graphene oxide for the purpose of some specific uses such as in the super-capacitor field simply by grinding while preserving the integrity of the GO sheet itself.

A first aspect of the invention provides a method of forming graphite oxide comprising the steps of:
a) providing intercalated flakes of graphite;
b) adding nitric acid to the graphite flakes in a reaction vessel at a temperature around 0° C.;
c) adding an oxidant to the mixture, while stirring and controlling the formation of $ClO_2$ such that it does not exceed about 10% v/v;
d) increasing the reaction temperature to room temperature over about 12 hours to allow the formation of graphite oxide;
e) washing and separating the graphite oxide from the reaction mixture to give an isolated graphite oxide;
wherein steps b) to d) are conducted under an air purge, while stirring.

A second aspect of the invention provides a graphite oxide obtainable by a method according to the invention.

A third aspect according to the invention provides the use of a graphite oxide according to the invention for the preparation of graphene.

A fourth aspect according to the invention provides graphite oxide flakes of about 180 μm to about 350 μm, having an oxidation degree < to about 3.

A fifth aspect of the invention provides an electronic device (e. g. capacitor cells) comprising elements containing or coated with a graphene or graphite according to the invention.

DRAWINGS

Further objects and advantageous features of the invention will be apparent from the claims, from the detailed description, and annexed drawings, wherein:

DETAILED DESCRIPTION OF EXEMPLARY EMBODIMENTS

The term "intercalated graphite flakes" refer to graphite flakes where molecules, atoms or ions are inserted between the carbon planes in graphite crystal structures.

The intercalated graphite flakes comprise covalent intercalation graphite and ionic intercalation graphite (such as intercalated graphite salts including bisulphate, graphite nitrate, perchlorate etc., intercalated graphite alkali metal, intercalated graphite halogen etc.) (Dresselhaus et al. 2002, *Advances in physics*, 51, 1; Chung, 2002, *Materials Science*, 37, 1475; Alliata, *Inauguraldissertation der philosophisch-naturwissenschafilichen Fakultät der Universität Bern*, 28 Jun. 2010). For example, sulfate or perchlorate intercalated flakes of graphite may be prepared by treating highly crystalline natural flake graphite with a mixture of sulfuric acid or perchloric acid and in some case with a certain amount other oxidizing agents such as $HNO_3$ which helps the sulfate intercalation such as described in Bayat et al., 2008, *Iranian Journal of Chemical Engineering* Vol. 5, No. 1. The term "intercalated graphite flakes" includes sulfated or perchlorated intercalated graphite flakes such as graphite hydrogen sulfate flakes or grapihte perchlorate which can be prepared as described in U.S. Pat. No. 4,091,083 or in *Alliata, Inauguraldissertation der philosophisch-naturwissenschaftlichen Fakultät der Universität Bern*, 28 Jun. 2010. Alternatively, sulfated intercalated graphite flakes can be prepared by Bayat et al., 2008, *Iranian Journal of Chemical Engineering* Vol. 5, No. 1. In a particular embodiment, the intercalation percentage ranges from about 2.5 to about 5%, typically from about 3 to about 3.5.

Characterization Methods:
Intercalation percentage can be measured by C/S atomic ratio by element analysis.
Graphite flakes size is typically determined by light scattering methods.

The C/O atomic ratio of graphene oxide or graphite oxide may be measured by standard methods such as those described in the present application and in particular by elemental analysis measurements upon combustion with an element analyzer, and by X-ray photoelectron spectrometry (XPS) analysis.

Further characterization of the graphene oxide or graphite oxide can be carried out by Raman spectroscopy giving information about the ratio of $sp^2$ to $sp^3$ type of carbon atom, information about the ratio of 2-dimensionality to 3-dimensionality (Zhu et al., 2010, *Advance Materials*, 22, 3906-3924)

Characterization of the graphene obtained from graphene oxide can be carried out by resistivity measurements.

Terminology:

The term "chlorate salt" comprises calcium chlorate, magnesium chlorate, barium chlorate, lithium chlorate, potassium chlorate and sodium chlorate.

The term "nitric acid" means fuming $HNO_3$, concentrated $HNO_3$ or a mixture thereof.

According to one aspect, invention provides a method of forming graphite oxide wherein the intercalated flakes of graphite are of about 180 µm to about 350 µm. In particular, the intercalated flakes of graphite are of about 180 µm to about 300 µm.

According to another aspect, the invention provides a method of forming graphite oxide according to the invention wherein the intercalated flakes of graphite are to intercalated flakes of graphite selected from sulfate and perchlorate intercalated flakes.

According to another aspect, the intercalated flakes of graphite are sulfate intercalated flakes of graphite.

According to another aspect of the invention, the intercalated flakes of graphite are sulfated intercalated flakes of graphite with an intercalation percentage ranging from about 2.5 to about 3.5%.

According to a further aspect of the invention, sulfate intercalated flakes of graphite are prepared by sulfation of flakes of graphite. Sulfated intercalated flakes of graphite from flakes of graphite can be prepared according to methods described in Bayat et al., 2010, *Advance Materials*, 22, 3906-3924 or in the application below.

According to another further aspect, the intercalated flakes of graphite are sulfated intercalated flakes of graphite obtained by a method comprising the following steps:

providing graphite flakes (e.g. natural graphite flaxes);

immersing the flakes in a mixture of sulfuric and nitric acids (e.g. with a 4:1 ratio) for 24 hours at room temperature under stirring;

washing the resulting intercalated graphite flakes (sulfate intercalated flakes) with distilled water to reach pH between about 3 and 4.

According to another further aspect, the intercalated flakes of graphite are sulfated intercalated flakes of graphite obtained by the above method, wherein the flakes are dried in an oven at about 100° C. (e.g. for about 1 hour).

According to another further aspect of the invention, the graphite oxide according to the invention has C/O atomic ratio comprised between about 2.7 and about 3.2. Preferably, the C/O atomic ratio is such than 2.7≤C/O<3.2. In particular, the graphite oxide according to the invention has C/O atomic ratio comprised between about 2.7 and 3.1.

According to another further aspect of the invention, the oxidant used in a method according to the invention is a chlorate salt, for example sodium chlorate.

According to another further aspect of the invention, the oxidant used in a method according to the invention such that the graphite to oxidant molar ratio is from about 0.7 to about 0.9, for example a molar ratio of 0.8.

According to another further aspect of the invention, the concentration of graphite in the nitric acid is comprised between about 0.07 to about 0.15 g/ml (for example 0.1 g/ml).

According to another further aspect, the method of the oxidant used in a method of the invention is sodium chlorate, wherein the molar ratio of graphite to sodium chlorate is from about 0.7 to about 0.9, for example a molar ratio of 0.8. In a further particular embodiment, the concentration of graphite in the nitric acid in a method under those conditions is comprised between about 0.07 to about 0.15 g/ml (for example 0.1 g/ml).

According to another further aspect of the invention, the controlling of the formation of $ClO_2$ such that its level in the reactor does not exceed about 10% v/v is carried out by adding the oxidant in portions.

According to another further aspect of the invention, the formation of $ClO_2$ in the reactor is controlled such that its level in the reactor does not exceed about 5% v/v.

According to another further aspect of the invention, the $ClO_2$ content of the gas outflow from the air purge is directly neutralized. For example, the direct neutralization of the gas outflow is carried out by submitting the gas flow on a sodium bisulfite solution (e.g. about 25 to 40%). According to a further aspect, the neutralized gas outflow is then further neutralized for removing the gaseous chlorine ($Cl_2$) formed after the first neutralization step, for example with sodium hydroxide (e.g. about 15 to 20%) before releasing the gas in the atmosphere. As a control, white vapors indicate that $ClO_2$ is effectively degraded in $Cl_2$ and when sodium bisulfite and/or the vapors become yellow, it indicates that the sodium bisulfite solution is not effective in neutralizing the $ClO_2$, and therefore should be renewed. The pH of the sodium hydroxide neutralizing solution should be controlled and should be renewed when neutral pH is reached.

According to another further aspect of the invention, a method according to the invention further comprises at least one sub-step d1) during and/or at the end of step d) of adding a further nitric acid amount to ensure sufficient mixing under step d).

According to another further aspect of the invention, a method according to the invention further comprises a plurality of sub-steps d1) of adding nitric acid (e.g. the total additional amount of nitric acid corresponding to between about 0.5 and 2 times the initial amount) to ensure sufficient mixing of the mixture obtained under step d).

According to another further aspect of the invention, the temperature of the reaction is increased under step d) at a rate of about 3 to 5° C./h, preferably of about 3 to 4° C./h.

According to a further aspect of the invention, a method according to the invention may further comprise the following steps after step d) and before step e) in order to ensure further safety to the method:

d2) warming the reaction mixture up to about 60° C. in 1 hour or more (control of the gas production) and stabilizing the temperature for about 30 minutes (ensuring to total extraction of $ClO_2$);

d3) Cooling reaction mixture to a temperature about 0° C. and adding ice (addition of water to acid).

In a further particular embodiment, the stirring is mechanical stirring.

In a further particular embodiment, the mixture obtained under step d), and in particular d3) is allowed to decant (e.g. for about 10-12 hours) and optionally the supernatant is sucked out before submitting the mixture to step e).

In a further particular embodiment, step e) of a method according to the invention comprises the following substeps:
- e1) adding water to the mixture obtained under step d) and optionally stirring; and
either
- e2i) allowing to decant (e.g. for about 30 minutes) and optionally the supernatant is sucked out; or
- e2j) filtering the mixture;

whereas steps e1 to e2i or e1 and e2j are repeated until a neutral pH for the mixture is reached.

In a further particular embodiment, isolated graphite oxide is obtained under step d) after an optional centrifugation step (typically between about 110 G (washing step) to about 1800 G (drying step) of the reaction mixture resulting from the last washing and/or filtration step. This centrifugation step allows isolating the graphite oxide end product (drying the cake) without damaging the GO sheets.

In another further particular embodiment, the method according to the invention optionally further comprises a further step f) of ultrasonicating the isolated graphite oxide flakes in order to decrease the size of the flakes (typically for some specific applications where a very low number of graphite oxide sheets are needed).

In a further particular embodiment, the method according to the invention comprises an optional further step g) of adding deionized water to the isolated graphite oxide flakes and/or lyophilizing the mixture.

In another further particular embodiment, the method according to the invention may further comprise a further step h) of grinding the lyophilized isolated graphite oxide flakes in order to decrease the size of the flakes. It is to be noted that surprisingly the inter-layer space of the graphite oxide is not altered by the grinding.

In a further particular embodiment, the invention provides the use of a graphite oxide according to the invention for the preparation of graphene such as for example by thermal reduction (thermal annealing reduction) as described in Pei et al., 2012, *Carbon*, 50, 3210-3228. For example, a graphite oxide according to the invention is subjected to the ultrasonication to obtain graphene oxide. The so-obtained graphene can be used for various applications such as described in EP 2445049.

In a further particular embodiment, the invention provides graphite oxide flakes of about 180 μm to about 350 μm, having an oxidation degree < or equal to about 3.

According to one aspect, a method according to the invention has the unexpected advantage to allow producing graphite oxide of high oxidation degree in spite of using large graphite flakes (large flakes having reduced surface for oxidation) within reasonable oxidation reaction times (progress of the reaction almost 100% achieved in large batches) and without the need of very low temperature cooling. Those high oxidation degrees are particularly useful for applications in electronics and more particularly in the high capacitor industry where high oxidation degrees ease the formation of small particles of large graphene sheets.

According to another aspect, a method according to the invention has the unexpected advantage to allow producing graphite oxide that could be exfoliated under ultrasonic treatment without damage producing large surface graphene oxide.

According to another aspect, a method according to the invention has the unexpected advantage to allow producing and isolating graphite oxide of high purity (notably without metallic residues) in a cost-effective manner without the need of heavy purification steps that are time-consuming, costly and with a high environmental impact in terms of water consumption.

According to another aspect, a method according to the invention has the unexpected advantage to allow producing and isolating graphite oxide while controlling and minimizing the amounts of the released toxic gases and therefore minimizing the associated safety risk for the manufacturing plant, as well as to minimizing the impact on the environment.

EXAMPLES

The advantages of the methods of the invention and the obtained products are supported by the following experiments. In the following experiences, the following analysis are carried-out for determining the degree of oxidation of the graphite:

C/O Atomic Ratio Determination

There are different ways to calculate the carbon/oxygen atomic ratio (C/O) for graphite oxide. It was decided to use the method described in Kaspar et al., 2010, supra as it gives comparable result with literature, and it is not influenced by the possible water contamination of samples.

Since the C/O ratio can be significantly (increased) distorted due to the presence of water, especially for GO, but also derived products that are highly hygroscopic and vacuum drying cannot removed water completely, the C/O ratio should never be alone considered, but rather together with results from other analytical methods. All the C/O provided below are given subtracting the proportion of hydrogen as water and are calculated using the % of O, C and H, as obtained by element analysis measurements by an element analyzer.

This test supports the stability of samples, the reproducibility of the measurement and that GO samples, once lyophilized, after being obtained by a method of the invention can be conserved at room temperature during months without significant modification in the C/O atomic ratio.

ATR FT-IR

Attenuated Total Reflectance (ATR) Fourier-Transformed Infrared spectroscopy (FT-IR) was used to compare the GO samples and check the consistency of the C/O atomic ratio results.

In the following experiences, the following starting materials are used:

Graphite Powder
   Graphite powder (TimCalSFG6) of about 6 μm was used in comparison examples.

Graphite Flakes
   Graphite flakes from Asbury from different flake sizes were used to prepare sulfate intercalated flakes: graphite flakes 3061 (300 μm) and 3268 (180 μm) and 332461 from Sigma-Aldrich (150 μm).

Sulfate intercalated graphite flakes
   Sulfate intercalated graphite flakes from different flake sizes were purchased from Asbury (1721: 300 μm, sulfur content: 3.5%; 3772: 300 μm, sulfur content: 3.1%; 3570: 180 μm, sulfur content: 3.1%; 1395: 180 μm, sulfur content: 3.1%), or prepared from the non-intercalated graphite flakes from Asbury or Aldrich described above.

The formation of the sulfate intercalated graphite flakes was formed as follows:

A solution of $HNO_3/H_2SO_4$ 1:4 is prepared and the graphite flakes are added to this solution in hydrothermal bombe at 80° C. during one night, without stirring. The end product is then filtrated and dried.

Alternatively, a solution of $HNO_3/H_2SO_4$ 1:4 is prepared and the graphite flakes are added to this solution at room temperature during one night, under stirring. The end product is then filtrated and dried.

The intercalation percentage of the so-obtained sulfate intercalated graphite was of about 3.5%. The integrity of the flakes after intercalation has been checked by X-ray and it was observed the absence of apparent flake size change and of microparticules that would indicate the breaking of the flakes due to the intercalation.

Example 1

Synthesis of Graphite Oxide by a Method of the Invention from Sulfate Intercalated Flakes of Graphite A mixture of 2.0 g of sulfate intercalated flakes (ASBURY 1721: 300 µm) and 30 ml of nitric acid (Merck 100% fuming) is cooled to 0° C. in a 100 ml glass reactor. A 250 l/h purge of air is started through the reactor and maintained all the reaction-long. At room temperature acid vapor are visible but no more at 0° C.

Then 17.0 g of sodium chlorate (oxidant) is added in 1 g portion over 2 h while stirring. After adding a few grams green vapor appears, it indicates the presence of $ClO_2$. The gas out-flow containing the formed $ClO_2$ was continuously neutralized by blowing into a sodium bisulfite solution (about 40%) and the gaseous chlorine produced by this neutralization step was then neutralized by sodium hydroxide before release in the atmosphere.

The reaction is then allowed to reach room temperature over 12 h. The color of the mixture has turn to turquoise during the previous 12 h. The mixture is warmed up to 60° C. over 1 h30 and left for 30 min. Then, the reaction was cooled to 0° C. and 50 g of ice was melt in a funnel over the reactor. Important exothermic (>20° C.) is observed due to the acid dilution.

The content of the reactor is filtered with a G1 fritted glass filter (porosity 1 (100 to 160 µm)). The slurry is washed with 1'500 ml of deionized water. 50 ml of deionized water is added to the obtained cake, frozen into liquid nitrogen, and lyophilized. 1.91 g of graphite oxide is obtained after lyophilization with the following oxidation characteristics: CHN (18.01.12): 61.31% C; 1.02% H; 37.67% O*. C/O: 2.77.

These results support that a method according to the invention allows the formation of large graphite oxide flakes that can be easily isolated by limited washing and filtration steps and which have a high oxidation degree. In comparison, standard methods (comparable examples 2-4) with lower oxidation degrees, unacceptable purity levels, for some with the formation of high levels of explosive and toxic gases and costly reaction conditions (reaction needed to be conducted at very low temperature, the isolation of the final product needs lengthy and costly washing steps).

Example 2

Synthesis of Graphite Oxide by Standard Brodie Method

In order to compare the graphite oxide obtained by a method of the invention and a known method of production of graphite oxide, the standard Brodie method was applied to graphite powder as follow: A mixture of 2.0 g (0.16 mol) graphite powder (Timcal SFG6) and 17.0 g (0.16 mol) sodium chlorate is cooled to −20° C. in a 50 ml Schlenk tube. A volume of 15 ml (2.78 mol) Nitric acid (Merck 100% fuming) is slowly added over 2 h. At the very beginning only acid vapor are visible, after a few milliliters the vapor turn to green, indicating the presence of $ClO_2$. The reaction is then allowed to reach room temperature over 12 h. The color of the mixture has turn to turquoise during the previous 12 h. The mixture is warmed to 60° C. over 1 h30 and left for 30 min. During the heating the $ClO_2$ release is especially important (b.p. $ClO_2$ 11° C.). Then, the reaction was cooled to 0° C. and 25 g of ice was melt in a funnel over the Schlenk tube. Important exothermic (>20° C.) is observed due to the acid dilution. The content of the Schlenk is left in two 50 ml centrifuge tube. Both are centrifuged at 3000 rpm for 15 min, supernatant is decanted away, and refill with 2×50 ml deionized water 10 times. First water washes are green colored, after 48 h in an open bottle, they become again clear. After 10 times washing, 2×50 ml of deionized water are added to the mixture and after good mixing, dumped into a 1 L flask. The mixture is frozen into liquid nitrogen, and lyophilized.

3.0 g of brown greenish graphite oxide is obtained after lyophilization with the following oxidation characteristics: CHN: 60.79% C 1.14% H 38.07% O. C/O ratio: 2.8.

This method leads to lengthy and difficult washing steps and it is anticipated not to be scalable due to the uncontrolled production of large amounts of $ClO_2$.

Example 3

Synthesis of Graphite Oxide by Standard Staudenmaier Method (Comparative Example: Non Invention)

Staudenmaier method as described in Staudenmaier, 1898, supra was applied to graphite powder (Timcal SFG6). The quality of the obtained graphite oxide was worse with an oxidation degree was very low (C/O ratios between 9.8 and 12.8). These results show that the staudenmaier method in not appropriate for scaling-up production of graphite oxide.

Example 4

Synthesis of Graphite Oxide by Standard Hummer Method (Comparative Example: Non Invention)

Hummer method as described in Hummers and Offeman, 1958, supra was applied to graphite powder (Timcal SFG6). The obtained graphite oxide contained residual manganese that could not be removed in spite of intensive washing. These results show that the Hummer method in not appropriate for scaling-up production of graphite oxide.

Example 5

Synthesis of Graphite Oxide by a Method of the Invention from Non-Intercalated and from Intercalated Flakes of Graphite of Various Sizes The method of the invention similar to the one described under Example 1 was repeated with various non-intercalated and with intercalated flakes of graphite of various sizes as follows to study the influence of those parameters on the filtration quality during the isolation step of the graphite oxide in a method of the invention. The annexed Table I summarizes the different flakes used, the resulting C/O atomic ratio of the graphite oxide obtained by the method of the invention and the quality of the filtration to isolate the graphite oxide.

The results listed in the annexed Table I (page 18) support the fact that the intercalated graphite flakes, in particular the sulfate intercalated flakes, either commercially available or prepared as described in the present application, are more easily oxidized by a method according to the invention compared to non-intercalated graphite flakes.

Further, both the size of the starting graphite flakes and the oxidation degree impact the quality of the filtration step for isolating the graphite oxide obtained by the method of the invention, the larger graphite flakes allowing a more efficient filtration that the smaller flakes. It is particularly unexpected that large flakes allow obtaining high degrees of oxidation and that in spite of those high degrees of oxidation (which normally render the flakes more breakable, in particular when submitted to filtration), the flakes show an excellent resistance to filtration.

Example 6

Synthesis of Graphite Oxide by a Method of the Invention at Various Graphite Concentrations in Nitric Acid and at Various Graphite to Oxidant Ratios The method of the invention similar to the one described under Example 1 was repeated with commercial sulfate intercalated flakes Asbury 1721 described above (graphite concentration in nitric acid of 0.1 g/ml) at various molar ratios graphite (G) to oxidant as follows to study the influence of those parameters on the filtration quality during the isolation step and of the C/O atomic ratio of the end product. The annexed Table II summarizes those results.

The data contained in the annexed Table II (page 19) shows that the molar ratio between the graphite and the oxidant (sodium chlorate) is an important parameter: a ratio lower than 0.6 greatly reduces the oxidation of graphite oxide and raises the C/O ratio above 3. In contrast, when the molar ratio is 1, the concentration of $NaClO_3$ in the reaction medium is too high and has the tendency to delaminate the graphite oxide, which renders the filtration more laborious.

Further, it has been observed that the concentration of the graphite in the nitric acid is also an important parameter: a concentration of 0.07 g/ml, reduces the oxidation of graphite oxide and raises the C/O ratio, while rendering the filtration more laborious. The annexed Table III (page 19) summarizes these results.

Example 7

Synthesis of Graphite Oxide by a Method of the Invention from Sulfate Intercalated Flakes of Graphite-Scaling-Up In order to confirm that the method of Example 1 is fully scalable, the following experiment was conducted on 3 kg of graphite flakes.

Solutions of sodium hydroxide and sodium bisulfite for neutralization steps of chlorine dioxide ($ClO_2$) and chlorine ($Cl_2$) are prepared and the gas neutralization facilities are started: a degradation reactor and two columns backwash columns.

3 kg of sulfate intercalated flakes (ASBURY 1721: 300 μm) are added to 30 l of fuming nitric acid (Merck 100%) and cooled to 0° C. in the reactor under mechanical stirring at 75 rpm. The mixture is cooled to 0° C. A flow of air in the reactor at 25 m³/h is maintained throughout the reaction such that the $ClO_2$ concentration (formed by additions of sodium chlorate) is maintained below 10% v/v. 21.24 kg of sodium chlorate (graphite to sodium chlorate molar ratio: 0.8) is added to the mixture by portions of 850 g, every 5 min (total 2 hours). The mixture temperature is then heated at a speed of 3 ° C./h up to 15° C.). Then, the mixture temperature is heated at 23° C. and allowed to react for 11 h 30 (graphite color changes from black to green). The loss of nitric acid during reaction is compensated by adding 2 liters after 4h30, 6h30 and 8h30 of reaction. Finally, 9 liters nitric acid are added to the reaction mixture after the 11h30 of reaction and the mixture is heated 1 h at 60° C., then the temperature is stabilized the temperature during minutes (degassing).

Then the temperature of the mixture is cooled to 0° C. and 60 kg of ice is slowly added. The mixture is settled to decant for 20 hours, the supernatant is aspirated with a cannula and 50 liters of water and the mixture is stirred at 75 rpm for 5 min before decanting during 30 min under stirring. These cleaning steps are repeated (about 11 times) until pH=7 (total volume of water=600 liters) (graphite oxide turns from green to brown). Then, the reaction medium is centrifuged to isolate the graphite oxide product. Product weight: 7'845 g. Dried product weight: 3'814.5 g. Percentage of water in the cake: 51.4%; CHN analysis: (22.06.12): C=61.7%; H=1.2%; O=37.1% (deducted); atomic ratio carbon/oxygen (C/O): 2.98

These results show that the method of the invention is fully scalable and lead to high oxidation degrees in reasonable reaction times and is using limited amounts of water and effort for end product isolation.

Example 8

Use of Graphite Oxide of the Invention in Cells

The method of the invention similar to the one described under Example 1 was repeated with commercial sulfate intercalated flakes Asbury 1721 described above (graphite concentration in nitric acid of 0.1 g/ml) with a molar ratio $NaClO_3$/Graphite equal to 0.95. By varying the oxidation time, different C/O ratios have been obtained (C/O=3.15 for an oxidation time of 8 hours, C/O=2.82 for an oxidation time of 16 hours, C/O=2.70 for an oxidation time of 16 hours two times (first time C/O=2.77)

Figure 1:
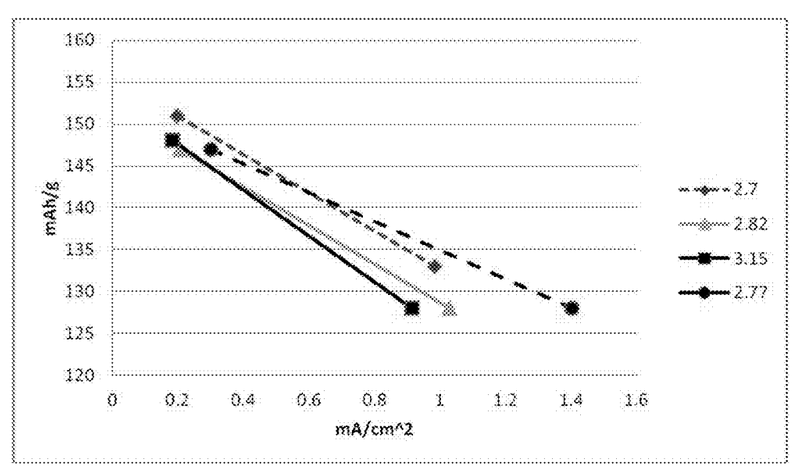
FIG. 1 shows the energy (mAh/g) vs rate capability (mA/cm$^2$) for cells comprising graphite oxide with different C/O ratios.

Then 0.06 g of such graphite oxide was dispersed in water 5 ml using an ultrasound bath for 30 minutes The cathode material LFP (LiFePO4) was added, 0.87 g and the solution was stirred for 2 hours. The water was evaporated and the powder was further dried at 250° C. for 1 hour under air. The composite active material LFP-GO was mixed with conductive additive SuperP Li and carboxymethyl cellulose and styrene butadiene in water with the weight ratio 93/4/1/2. The composite slurry was coated on aluminum, dried, cut in 1.5 cm² disk, pressed with 25 kN and measured versus Li metallic in coin cell 2025. The electrolyte was 1M LiPF6 EC:DMC (1:1). The energy (mAh/g) vs rate capability (mA/cm²) was compared for the different samples. The results are shown by FIG. 1.

It is shown that using GO with higher C/O ratio gives lower results at high rate and best results were observed for C/O ratio near to 2.7.

TABLE I

| Flakes | Type | Flakes size (μm) | G concentration (g/ml) | Molar ratio NaClO$_3$/G | C/O | Filtration quality |
|---|---|---|---|---|---|---|
| Asbury 1721 (Commercially available) | Sulfate intercalated flakes (3.5% S) | 300 | 0.1 | 0.8 | 2.75 | ++ |
| Asbury 3772 (Commercially available) | Sulfate intercalated flakes (3.1% S) | 300 | 0.07 | 1 | 2.89 | ++ |
| sulfate Asbury 3061 (as described above) | Sulfate intercalated flakes (about 3.5% S) | 300 | 0.1 | 0.8 | 2.62 | ++ |
| Asbury 1395 (Commercially available) | Sulfate intercalated flakes (3.5% S) | 180 | 0.07 | 1 | 2.55 | ++ |
| Asbury 3570 (Commercially available) | Sulfate intercalated flakes (3.1% S) | 180 | 0.07 | 1 | 2.98 | + |
| Asbury 3268 (Commercially available) | Non-intercalated Flakes | 180 | 0.1 | 0.8 | 3.3 | ++ |
| sulfate Asbury 3268 (as described above) | Sulfate intercalated flakes (about 3.5% S) | 180 | 0.1 | 0.8 | 3.2 | -- |
| Sulfate 332461 Sigma-Aldrich (as described above) | Sulfate intercalated flakes (about 3.5% S) | 150 | 0.1 | 0.8 | <2 | - |

Filtration values ++: perfect filtration (less than 10 min), +: good filtration (less than 1 h), -: bad filtration (more than 1 h), --: very bad filtration (more than 1 night or no filtration)

TABLE II

| Conditions | G concentration (g/ml) | Molar ratio NaClO$_3$/G | C/O | Filtration quality |
|---|---|---|---|---|
| 1 | 0.1 | 0.6 | 3.12 | ++ |
| 2 | 0.1 | 1 | 2.93 | -- |
| 3 | 0.1 | 0.85 | 2.77 | + |
| 4 | 0.1 | 0.8 | 2.75 | ++ |

TABLE III

| Conditions | G concentration (g/ml) | Molar ratio G/NaClO$_3$ | C/O | Filtration quality |
|---|---|---|---|---|
| 5 | 0.07 | 1 | 3.09 | -- |

What is claimed is:

1. A method of forming graphite oxide comprising:
   a) adding intercalated flakes of graphite in a reaction vessel;
   b) adding nitric acid to the intercalated graphite flakes in the reaction vessel at a temperature around 0° C. to obtain a mixture;
   c) adding a chlorate salt as an oxidant to the mixture, while stirring and controlling the formation of ClO$_2$ such that it does not exceed about 10% v/v;
   d) increasing the reaction temperature at a rate of about 3 to 5° C/h to room temperature over about 12 hours to form graphite oxide; and
   e) washing and separating the graphite oxide from the reaction mixture to give an isolated graphite oxide;
   wherein b) to d) are conducted under an air purge, while stirring.

2. The method according to claim 1, wherein the flakes of graphite have a flake size of about 180 μm to about 350 μm.

3. The method according to claim 1, wherein the flakes of graphite are selected from sulphate and perchlorate intercalated flakes of graphite.

4. The method according to claim 1, wherein the flakes of graphite are sulphate intercalated flakes of graphite.

5. The method according to claim 1, wherein the chlorate salt is sodium chlorate.

6. The method according to claim 1, wherein the controlling of the formation of ClO$_2$ is such that its level in the reactor does not exceed about 10% v/v is carried out by adding the oxidant in portions or by dosing the addition of the oxidant.

7. The method according to claim 1, further comprising, during and/or at the end of d):
   d1) adding a further nitric acid amount to ensure sufficient mixing of the mixture.

8. The method according to claim 1, further comprising, after d) and before e):
   d2) warming the reaction mixture up to about 60° C. in 1 hour or more and stabilizing the temperature for about 30 minutes; and
   d3) cooling the reaction mixture to a temperature of about 0° C. and adding ice.

9. The method according to claim 1, wherein the stirring is mechanical stirring.

10. The method according to claim 1, wherein the washing and separation e) comprises the following:
    e1) adding water to the mixture obtained under d) and optionally stirring; and either
    e2i) allowing to decant and optionally sucking out the supernatant; or
    e2j) filtering the mixture;
    wherein e1) and e2l) or e1) and e2j) are repeated until a neutral pH for the mixture is reached.

11. The method according to claim 1, wherein isolated graphite oxide is obtained under e) after an optional centrifugation of the reaction mixture resulting from the last washing and/or filtration.

12. The method according to claim 1, further comprising g) adding deionized water to the isolated graphite oxide flakes obtained under e) and lyophilizing the mixture.

13. The method according to claim 1, wherein the C/O atomic ratio of the graphite oxide obtained is between about 2.7 and about 3.2.

14. The method according to claim 1, wherein the graphite oxide has a flake size of about 180 μm to about 350 μm, and an oxidation degree<or equal to about 3.

15. A method of preparing graphene, comprising:
    a) adding intercalated flakes of graphite in a reaction vessel;

b) adding nitric acid to the intercalated graphite flakes in the reaction vessel at a temperature around 0° C. to obtain a mixture;

c) adding a chlorate salt as an oxidant to the mixture, while stirring and controlling the formation of $ClO_2$ such that it does not exceed about 10% v/v;

d) increasing the reaction temperature at a rate of about 3 to 5° C./h to room temperature over about 12 hours to form graphite oxide;

e) washing and separating the graphite oxide from the reaction mixture to give an isolated graphite oxide; and subjecting the graphite oxide to ultrasonication to obtain graphene, wherein b) to d) are conducted under an air purge, while stirring.

16. A method of preparing graphene, comprising:

a) adding intercalated flakes of graphite in a reaction vessel;

b) adding nitric acid to the intercalated graphite flakes in the reaction vessel at a temperature around 0° C. to obtain a mixture;

c) adding a chlorate salt as an oxidant to the mixture, while stirring and controlling the formation of $ClO_2$ such that it does not exceed about 10% v/v;

d) increasing the reaction temperature at a rate of about 3 to 5° C./h to room temperature over about 12 hours to form graphite oxide;

e) washing and separating the graphite oxide from the reaction mixture to give an isolated graphite oxide having a flake size of about 180 μm to about 350 μm, and having an oxidation degree<or equal to about 3; and subjecting the graphite oxide to ultrasonication to obtain graphene, wherein b) to d) are conducted under an air purge, while stirring.

17. The method according to claim 8, wherein the C/O atomic ratio of the graphite oxide is between about 2.7 and about 3.2.

18. The method according to claim 8, wherein the graphite oxide has a flake size of about 180 μm to about 350 μm, and an oxidation degree<or equal to about 3.

* * * * *